US012746545B2

(12) United States Patent
Han et al.

(10) Patent No.: US 12,746,545 B2
(45) Date of Patent: Sep. 29, 2026

(54) PATTERN ELECTRODE STRUCTURE FOR ELECTROWETTING APPARATUS

(71) Applicants: Hyundai Motor Company, Seoul (KR); Kia Corporation, Seoul (KR)

(72) Inventors: Kwang-Joon Han, Seongnam-Si (KR); Jai-Min Han, Suwon-Si (KR); Byung-Kyu Cho, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 699 days.

(21) Appl. No.: 17/748,786

(22) Filed: May 19, 2022

(65) Prior Publication Data

US 2023/0182131 A1 Jun. 15, 2023

(30) Foreign Application Priority Data

Dec. 10, 2021 (KR) ........................ 10-2021-0176415

(51) Int. Cl.
*B01L 3/00* (2006.01)

(52) U.S. Cl.
CPC ..... *B01L 3/502715* (2013.01); *B01L 3/50273* (2013.01); *B01L 3/502792* (2013.01); *B01L 2400/0427* (2013.01)

(58) Field of Classification Search
CPC ........... B01L 3/502715; B01L 3/50273; B01L 3/502792; B01L 2400/0427; G02B 27/0006; G02B 2207/115; G02B 1/18; G02B 26/005; B60S 1/02; B60S 1/56; B08B 7/02; B08B 11/04
See application file for complete search history.

(56) References Cited

U.S. PATENT DOCUMENTS

| | | | |
|---|---|---|---|
| 8,854,718 B2 | 10/2014 | Jung et al. |
| 9,201,235 B2 | 12/2015 | Jung |
| 2004/0211659 A1 | 10/2004 | Velev |
| 2013/0101753 A1 | 4/2013 | Eral et al. |

(Continued)

FOREIGN PATENT DOCUMENTS

| | | |
|---|---|---|
| JP | 6802709 B2 | 12/2020 |
| KR | 10-2010-0035691 A | 4/2010 |

(Continued)

*Primary Examiner* — Alexander W Keeling
*Assistant Examiner* — Randall Lee Gamble, Jr.
(74) *Attorney, Agent, or Firm* — MORGAN, LEWIS & BOCKIUS LLP

(57) ABSTRACT

A pattern electrode structure for an electrowetting apparatus, which is laminated between a base material and a dielectric layer of the electrowetting apparatus, includes a first electrode portion including a first electrode connection portion, a first basal pattern electrode connected to the first electrode connection portion, and a plurality of first upper branch electrodes connected to the first basal pattern electrode, and a second electrode portion including a second electrode connection portion, a second basal pattern electrode connected to the second electrode connection portion, and a plurality of second upper branch electrodes connected to the second basal pattern electrode, the second electrode portion having a different polarity from the first electrode portion, in which the second basal pattern electrode extends and traverses in a width direction of a plane of the pattern electrode structure.

6 Claims, 9 Drawing Sheets

(56) References Cited

U.S. PATENT DOCUMENTS

| | | | | |
|---|---|---|---|---|
| 2017/0153517 | A1 | 6/2017 | Shin | |
| 2018/0113297 | A1 | 4/2018 | Desai et al. | |
| 2019/0235335 | A1* | 8/2019 | Lee | G02F 1/1368 |
| 2020/0346620 | A1* | 11/2020 | Chung | B60S 1/02 |

FOREIGN PATENT DOCUMENTS

| | | | |
|---|---|---|---|
| KR | 10-2014-0028366 | A | 3/2014 |
| KR | 10-1805300 | B1 | 11/2017 |
| KR | 10-2018-0045079 | A | 5/2018 |
| KR | 10-2010634 | B1 | 8/2019 |
| KR | 10-2019-0125247 | A | 11/2019 |
| KR | 10-2102653 | B1 | 4/2020 |
| KR | 10-2152647 | B1 | 9/2020 |
| KR | 10-2021-0057899 | A | 5/2021 |
| KR | 10-2579168 | B1 | 9/2023 |
| WO | WO 2015/164847 | A1 | 10/2015 |
| WO | WO2024/072028 | A1 | 4/2024 |

* cited by examiner

400

PATTERN ELECTRODE STRUCTURE FOR ELECTROWETTING APPARATUS

CROSS-REFERENCE TO RELATED APPLICATION

The present application claims priority to Korean Patent Application No. 10-2021-0176415, filed on Dec. 10, 2021, the entire contents of which is incorporated herein for all purposes by this reference.

BACKGROUND OF THE PRESENT DISCLOSURE

Field of the Present Disclosure

The present disclosure relates to an electrode structure to which a pattern structure using an electrowetting phenomenon is applied.

Description of Related Art

An electrowetting phenomenon refers to a phenomenon in which a contact angle between a solid and an electrolyte is changed by a potential difference between the solid and the electrolyte.

The use of the present phenomenon may control surface tension of a droplet placed on an electrode coated with an insulator, controlling deformation/movement of a microfluid of a micro-liter (μl) unit or less.

Furthermore, a weight of an application product may be reduced because a separate external driver is not required to operate the application product. Electric power consumption is low and a response speed is high because a flow of electric current is restricted by the insulator applied onto the electrode. Therefore, the electrowetting phenomenon is receiving great attention in various industrial fields.

Examples of the use of electrowetting in the industries include next-generation electronic devices such as lab-on-a-chips, fluid lenses, and displays that operate in different ways from the related art.

Furthermore, an electrowetting apparatus may be used to move, deform, and remove a droplet formed on a glass. Therefore, the electrowetting apparatus may be mounted on a windshield, a side mirror, a camera, or the like of a vehicle to remove rainwater and dewdrops.

The present disclosure relates to a self-cleaning technology using the electrowetting phenomenon.

The electrowetting self-cleaning apparatus has a structure and function capable of periodically and repeatedly applying direct current or alternating current to a surface of a board.

When a fluid droplet (sessile drop) having a polarity is placed on a surface of the electrowetting self-cleaning apparatus, the fluid droplet having the polarity may receive an attractive force and a repulsive force because of an electric field formed on the surface of the board.

Therefore, the fluid droplet having the polarity may be drawn in a direction of the electric field when direct current voltage is applied, and the fluid droplet having the polarity may vibrate (oscillate) because of a periodic change in electric field when alternating current voltage is applied.

A technology using alternating current generates vibration of the fluid droplet having the polarity and causes falling of the fluid droplet by reducing a fixing force of the fluid droplet positioned on the surface of the apparatus.

That is, a relationship between forces is represented by gravity=fixing force (frictional force+viscous force+reaction force made by contact angle hysteresis) before the voltage is applied (the fluid droplet adheres to the surface). The relationship between forces is represented by gravity>fixing force (frictional force+viscous force+reaction force ↓ made by contact angle hysteresis) after the voltage is applied (the fluid droplet begins to slide), and the fluid droplet falls.

In the instant case, the contact angle hysteresis (CAH) means a phenomenon in which the contact angle has a particular range because of heterogeneity of a solid surface or an external factor.

FIG. 1 illustrates a basic electrowetting self-cleaning apparatus in which an electrode layer 10, a dielectric layer 30, and a water-repellent layer 40 are laminated on a glass 20 which is a base material.

The type of base material 20 is not limited, but a transparent glass may be used to be mounted on a product such as a camera that transmits visible rays.

The electrode layer 10 is a transparent electrode pattern layer and needs to be positioned at a lower end portion of the dielectric layer, and the performance of the electrode layer 10 is improved as electrical conductivity increases.

The electrode layer 10 need not be necessarily transparent, but the transparent electrode needs to be used to be mounted on the product that transmits visible rays. As representative materials, oxide-based ITO, polymer-based PEDOT:PSS, oxide-polymer composites (FTO), and the like may be used.

The performance may be improved as the dielectric layer 30 has a high dielectric constant and a small thickness. The durability and lifespan are improved as the dielectric layer 30 has high dielectric breakdown strength and a small amount of defects. A deviation in performance and durability decreases as the dielectric layer 30 becomes more uniform, more homogeneous, and more continuous.

The dielectric layer 30 may be configured as a single layer or a multi-layer. As representative materials, oxide/nitride-based materials such as $SiO_2$, $TiO_2$, $Al_2O_3$, $CeO_2$, $HfO_2$, $ZrO_2$, ZnO, SiON, and $Si_3N_4$, and polymer-based materials such as Parylene-C, a cyclic olefin polymer (COP), and para-methoxy methamphetamine (PMMA) may be used. As deposition methods, wet processes (spray, spin-coating, inkjet, etc.) and dry processes (E-beam, sputtering, CVD, etc.) may be used.

The water-repellent layer 40 is not an essential element and may be omitted if an outermost peripheral layer of the dielectric layer has a sufficiently large contact angle.

A fluorine compound is used as a representative material, and a coating process is performed by a method such as E-beam spin coating.

If a size of the fluid droplet is equal to or smaller than a width of the currently positioned electrode, an electromagnetic force may be decreased by an adjacent electrode so that vibration may decrease or disappear.

Therefore, as illustrated in FIG. 2, an electrode E needs to be designed to be suitable for a target size of the fluid droplet, i.e., the droplet D to be removed, and the electrode E needs to have a predetermined amount of overlap O in which the fluid droplet is provided over the adjacent electrodes.

Related art includes a technology in which a pattern is configured so that an electrode is in parallel with a gravitational direction, allowing a droplet to easily fall in a direction of the electrode.

However, because it is difficult for a droplet including a small gravity due to a small mass to fall, there is a limitation in performing self-cleaning on the droplet with a small size.

For the present reason, there is a limitation in that efficiency becomes low when a thickness of the electrode increases.

Furthermore, in the case of a structure in which a board is inclined, the gravity is decreased by an inclination angle. When the inclination angle reaches a particular angle, the fluid droplet does not move downward any further.

According to the patent document, it is difficult to induce a falling motion even calculatively if a volume of a water droplet is 0.2 μl to 0.1 μl.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pattern electrode structure for an electrowetting apparatus, which is configured for more efficiently exhibiting self-cleaning performance even though the electrowetting apparatus has a small inclination angle because of an application environment.

As an exemplary embodiment of the present disclosure, the present disclosure provides a pattern electrode structure for an electrowetting apparatus, which is laminated between a base material and a dielectric layer of the electrowetting apparatus, the pattern electrode structure including: a first electrode portion including a first electrode connection portion, a first basal pattern electrode connected to the first electrode connection portion, and a plurality of first upper branch electrodes connected to the first basal pattern electrode; and a second electrode portion including a second electrode connection portion, a second basal pattern electrode connected to the second electrode connection portion, and a plurality of second upper branch electrodes connected to the second basal pattern electrode, the second electrode portion having a different polarity from the first electrode portion, in which the second basal pattern electrode extends and traverses in a width direction of a plane of the pattern electrode structure.

Furthermore, the second basal pattern electrode may be formed at a height corresponding to a boundary portion of a lower end portion of a region of interest (ROI) of the electrowetting apparatus.

Furthermore, the first and second upper branch electrodes may be formed in an upper region defined by the second basal pattern electrode, provided in a vertical direction of the pattern electrode structure, and alternately provided in parallel with one another in a horizontal direction thereof.

Furthermore, the first electrode portion may further include first lower branch electrodes, the second electrode portion may further include second lower branch electrodes, and the first and second lower branch electrodes may be formed in a lower region defined by the second basal pattern electrode, provided in the vertical direction of the pattern electrode structure, and alternately provided in parallel with one another in the horizontal direction thereof.

Furthermore, the first upper branch electrode and the second lower branch electrode may be formed in parallel, and the second upper branch electrode and the first lower branch electrode may be formed in parallel.

Alternatively, the pattern electrode structure may further include a drawing electrode formed below the second basal pattern electrode and extending and traversing in the width direction of the plane of the pattern electrode structure.

Furthermore, the drawing electrode may be connected to the first electrode connection portion.

As an exemplary embodiment of the present disclosure, the present disclosure provides a pattern electrode structure for an electrowetting apparatus, which is laminated between a base material and a dielectric layer of the electrowetting apparatus, the pattern electrode structure including: a first electrode portion including a first electrode connection portion, a first basal pattern electrode connected to the first electrode connection portion, and a plurality of first upper branch electrodes connected to the first basal pattern electrode; a second electrode portion including a second electrode connection portion, a second basal pattern electrode connected to the second electrode connection portion, and a plurality of second upper branch electrodes connected to the second basal pattern electrode, the second electrode portion having a different polarity from the first electrode portion; and a third electrode portion including a third electrode connection portion and a third branch electrode connected to the third electrode connection portion, the third electrode portion being formed below the second basal pattern electrode, in which the second basal pattern electrode extends and traverses in a width direction of a plane of the pattern electrode structure.

Furthermore, the second basal pattern electrode may be formed at a height corresponding to a boundary portion of a lower end portion of a region of interest (ROI) of the electrowetting apparatus.

Furthermore, the first and second upper branch electrodes may be formed in an upper region defined by the second basal pattern electrode, provided in a vertical direction of the pattern electrode structure, and alternately provided in parallel with one another in a horizontal direction thereof.

Furthermore, the third branch electrode may be formed below the second basal pattern electrode and extend and traverse in the width direction of the plane of the pattern electrode structure.

Meanwhile, the third electrode portion may have a different polarity from the second electrode portion.

Furthermore, the pattern electrode structure may further include a fourth electrode portion including a fourth electrode connection portion and a fourth branch electrode connected to the fourth electrode connection portion, and the fourth branch electrode may be formed below the third branch electrode and extend and traverse in the width direction of the plane of the pattern electrode structure.

Furthermore, the third electrode portion may have a different polarity from the second electrode portion, the third branch electrode may be formed below the second basal pattern electrode and extend and traverse in the width direction of the plane of the pattern electrode structure, the third branch electrode may be provided in plural, and the plurality of third branch electrodes may branch off from the third basal pattern electrode and be spaced from one another in a vertical direction.

Furthermore, the pattern electrode structure may further include a fourth electrode portion including a fourth electrode connection portion and a fourth branch electrode connected to the fourth electrode connection portion, the fourth electrode portion having a different polarity from the third electrode portion, the fourth branch electrode may be provided in plural, and the plurality of fourth branch electrodes may branch off from the fourth basal pattern electrode and be formed in the width direction of the pattern electrode structure and provided between the plurality of third branch electrodes.

The present disclosure provides the method configured for instantaneously increasing movability of the fluid droplet when the movability of the fluid droplet decreases while the oscillation-type electrowetting self-cleaning apparatus operates.

The method may draw the fluid droplet by use of the attractive electromagnetic force mainly when an inclination of the board is low, the water droplet is small in size, or there occurs the adhesion of the water droplet to the surface such as a phenomenon in which electric charges are stuck, solving the problem of the adhesion of the water droplet to the surface.

As the additional branch patterns and the existing oscillation branch patterns are alternately arranged, the drawing motion may be generated, and a magnitude of force of the drawing motion reaches a value of several hundred times that of the oscillation motion.

The method of arranging the patterns and the angle at which the patterns are arranged may vary depending on mounting angles, positions, and design specifications of the application, and a configuration of a circuit may be simplified by efficiently disposing the patterns.

Therefore, the present disclosure is more suitable for the application such as a side camera (for SVM/BVM) having a small angle with respect to the ground surface and effective in solving an error of a detection detector caused by rainwater, contamination, or the like.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
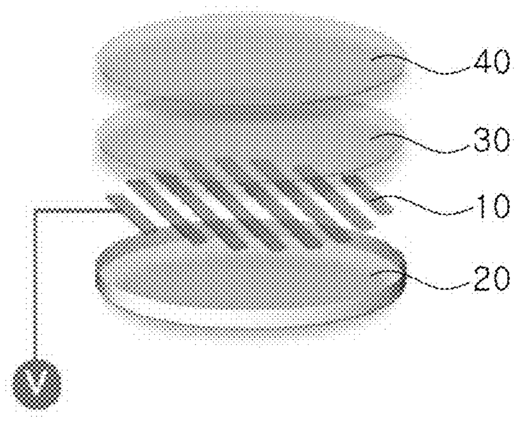
FIG. 1 is a schematic view of a basic electrowetting apparatus.
Figure 2:
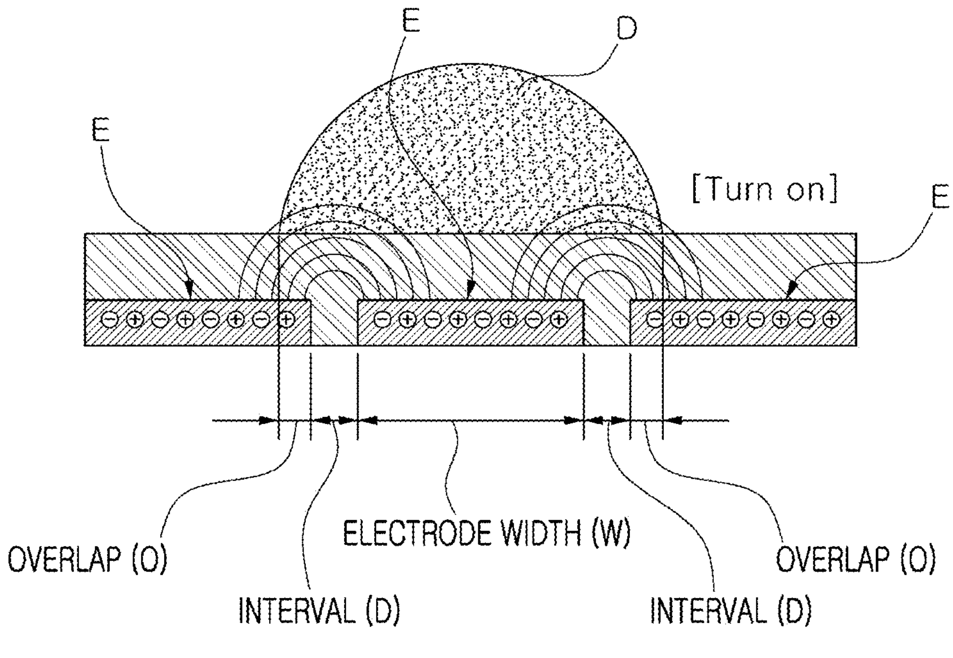
FIG. 2 is a view exemplarily illustrating a comparison in size between a droplet and an electrode.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the exemplary accompanying drawings, and since these embodiments, as examples, may be implemented in various different forms by those skilled in the art to which the present disclosure pertains, they are not limited to the exemplary embodiments described herein.

To sufficiently understand the present disclosure, advantages in operation of the present disclosure, and the object to be achieved by carrying out the present disclosure, reference needs to be made to the accompanying drawings for illustrating an exemplary embodiment of the present disclosure and contents included in the accompanying drawings.

Furthermore, in the description of the present disclosure, the repetitive descriptions of publicly-known related technologies will be reduced or omitted when it is determined that the descriptions may unnecessarily obscure the subject matter of the present disclosure.

The present disclosure is directed to facilitate falling of a droplet by applying a force to the droplet by applying voltage through the arrangement of electrodes. When an electrowetting apparatus is provided at an angle of 90 degrees with respect to the ground surface, the droplet more easily falls. However, the droplet needs to easily fall even when the electrowetting apparatus is provided at a predetermined angle. The present disclosure provides a pattern electrode structure configured for allowing the droplet to easily fall even though a gradient is small.

For example, in a case in which the electrowetting apparatus is applied to a side camera for a surround view monitor (SVM) mounted at a front side, a rear side, or a lateral side of a vehicle, an inclination angle of the camera is very small because a directional angle is directed toward a bottom surface because of the use of the camera.

The angle is about 15 degrees in left and right directions and 5 degrees or smaller in a rear direction thereof.

Therefore, in the case of the side camera for the SVM, a rate of removing rainwater decreases because of a small inclination angle when an electrowetting function is applied. If a vertical pattern in the related art is simply applied, there is an increasing probability that the water droplet adheres to the surface.

When the inclination of the camera is rotated by 15°, an inclination angle of a lens surface ranges from up to 50° to 0°. The inclination angle is within a range of 14° to 49° when only a region of interest (ROI) used by the side camera for SVM and blind-spot view monitor (BVM) functions is considered.

Therefore, there is an increasing probability that the water droplet remains on the surface when the inclination angle is about 14°, and this may be shown on a camera image.

The present disclosure relates to a technology configured for increasing movability of a fluid droplet only in a particular region when falling movability of the fluid droplet is decreased by a small inclination angle of the electrowetting apparatus as described above.

The present disclosure relates to a technology in which an additional electrode is provided at an end portion of a branch electrode having a particular polarity, and a fluid droplet formed at the end portion of the branch electrode is drawn by an attractive electromagnetic force.

The additional electrode needs to have a potential difference of a particular magnitude or larger from the branch electrode (opposite polarity), and the fluid droplet (having a polarity) being in contact with the additional electrode performs a drawing motion while being drawn by the attractive force. Because the gravity has a small effect on the drawing motion generated as described above, an influence of the inclination angle of the electrowetting apparatus is insufficient.

Figure 3:
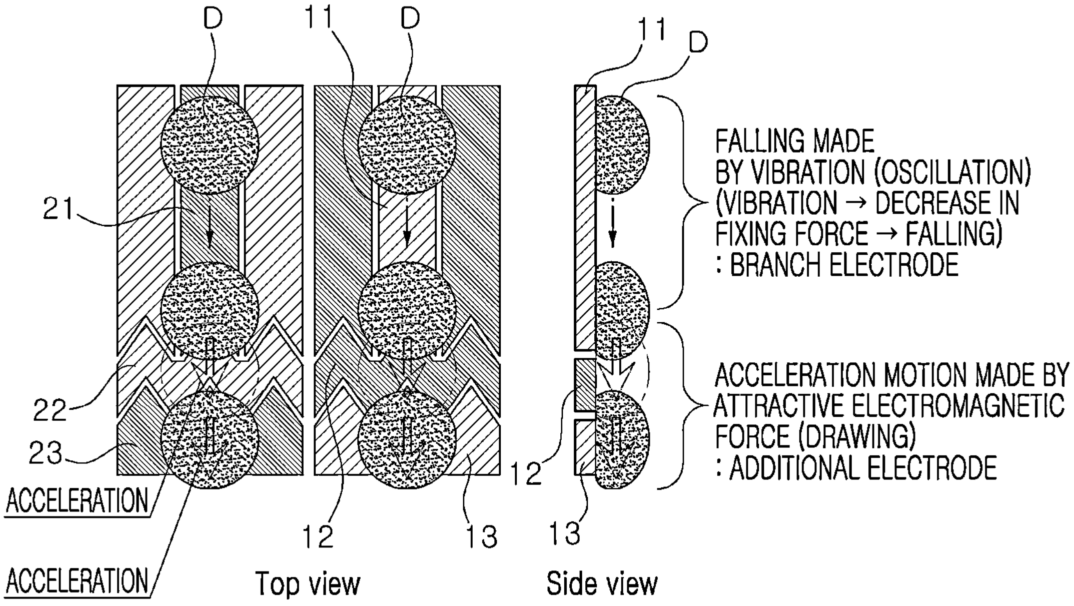
FIG. 3 is a view for explaining a principle of a pattern electrode structure according to an exemplary embodiment of the present disclosure.

That is, as illustrated in FIG. 3, a second electrode 12 or 22 having a different polarity from a first electrode 11 or 12 is provided below the first electrode 11 or 21 so that a droplet D falling along the first electrode by vibration is accelerated downward by an attractive force generated by the second electrode 12 or 22. Furthermore, the droplet D is accelerated downward by an attractive electromagnetic force generated by a third electrode 13 or 23 provided below the second electrode 12 or 22 and having a different polarity from the second electrode.

The electrowetting may selectively use a drawing motion and an oscillation motion depending on a method of applying voltage and a configuration of an electrode pattern. A vertical pattern structure in the related art utilizes only the oscillation motion.

The polarities need to be sequentially changed along a movement route of the fluid droplet to generate the drawing motion, and the fluid droplet is moved by the attractive electromagnetic force made by the changed polarity.

Because the drawing motion is characterized in that the attractive electromagnetic force is a main force, the drawing motion may be less affected by the gravity and performed even on a flat plate having no inclination angle.

That is, the present disclosure provides the electrowetting apparatus to which a hybrid pattern is applied based on the inclination angle of the board so that the oscillation principle may be used in a section in which the inclination angle is large and the drawing principle may be used in a section in which the inclination angle is small.

The polarity is changed in the movement direction of the fluid droplet to generate the drawing motion, and the attractive electromagnetic force made by the change in polarity is added to the gravity so that the fluid droplet may fall even though the inclination is low. When the electrowetting is applied to a start point of the pattern, high acceleration is added to the fluid droplet, providing a force that overcomes a static frictional force.

Based on the principle of the present disclosure, the principle of the pattern electrode structure according to the exemplary embodiments of the present disclosure will be described with reference to FIG. 4, FIG. 5, FIG. 6, and FIG. 7.

As illustrated in FIG. 4, FIG. 5, FIG. 6, and FIG. 7, first upper branch electrodes 113, 213, 313, and 413 and second upper branch electrodes 123, 223, 323, and 423 extend from above to below and are alternately provided in parallel in the horizontal direction thereof.

Figure 4:
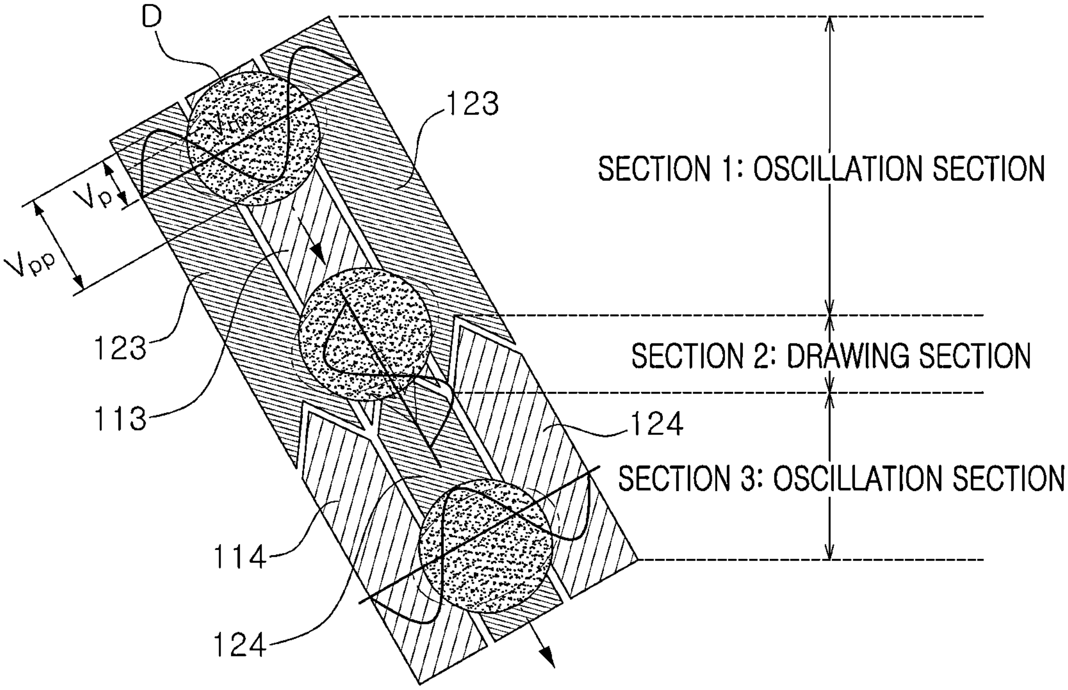
FIG. 4 is a view exemplarily illustrating a principle of a pattern electrode structure according to a first exemplary embodiment of the present disclosure.

In a first exemplary embodiment in FIG. 4, the second lower branch electrode 124 having a different polarity from the first upper branch electrode 113 is provided below the first upper branch electrode 113, and the first lower branch electrode 114 having a different polarity from the second upper branch electrode 123 is provided below the second upper branch electrode 123.

Therefore, Section 1 operates as an oscillation section, Section 2, which goes beyond a boundary, operates as a drawing section, and Section 3 also operates as an oscillation section.

In Section 1, vibration is generated by applying alternating current voltage having a particular frequency, and the fluid droplet falls because of a decrease in fixing force due to the vibration. In Section 2, an attractive force is generated by applying alternating current voltage having a phase difference of 180 degrees from Section 1 so that acceleration is generated by the attractive force.

Furthermore, in Section 3, vibration is generated by applying alternating current voltage having the same frequency and magnitude as Section 1, and Section 3 has the phase difference of 180 degrees from Section 1 because of a change in phase difference in Section 2.

It is acceptable as long as only the phase difference of 180 degrees is present between Section 1 and the Section 3, the phase difference of 180 degrees may be implemented only by disposing the pattern without a configuration of a separate circuit, and a circuit configuration for a phase delay may be provided.

Figure 5:
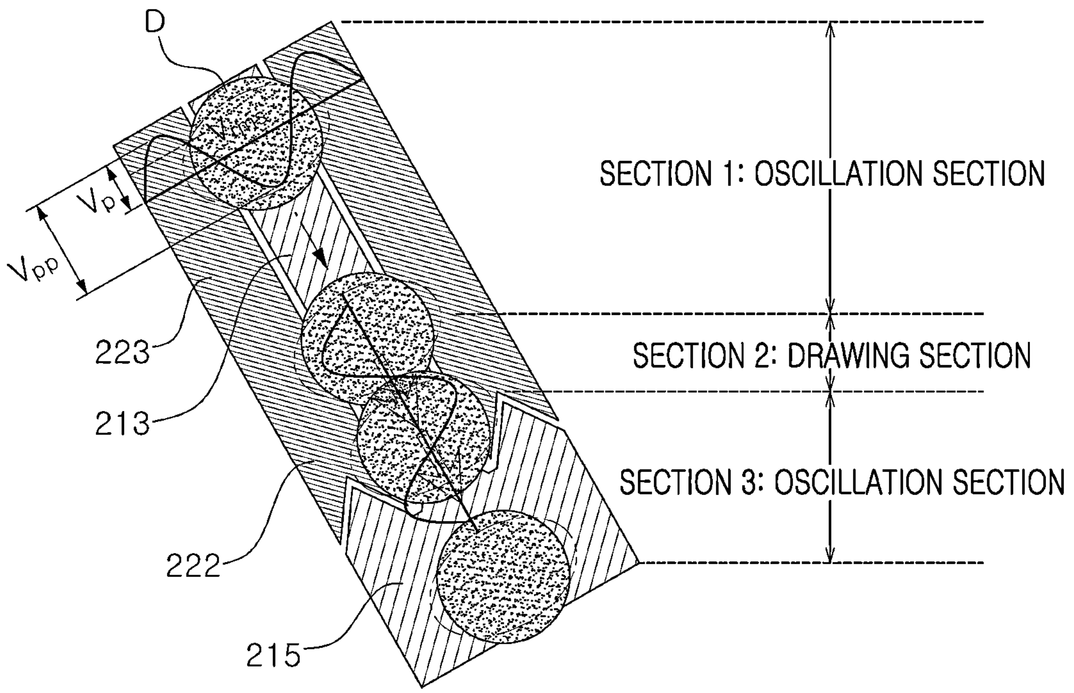
FIG. 5 is a view exemplarily illustrating a principle of a pattern electrode structure according to a second exemplary embodiment of the present disclosure.
Figure 6:
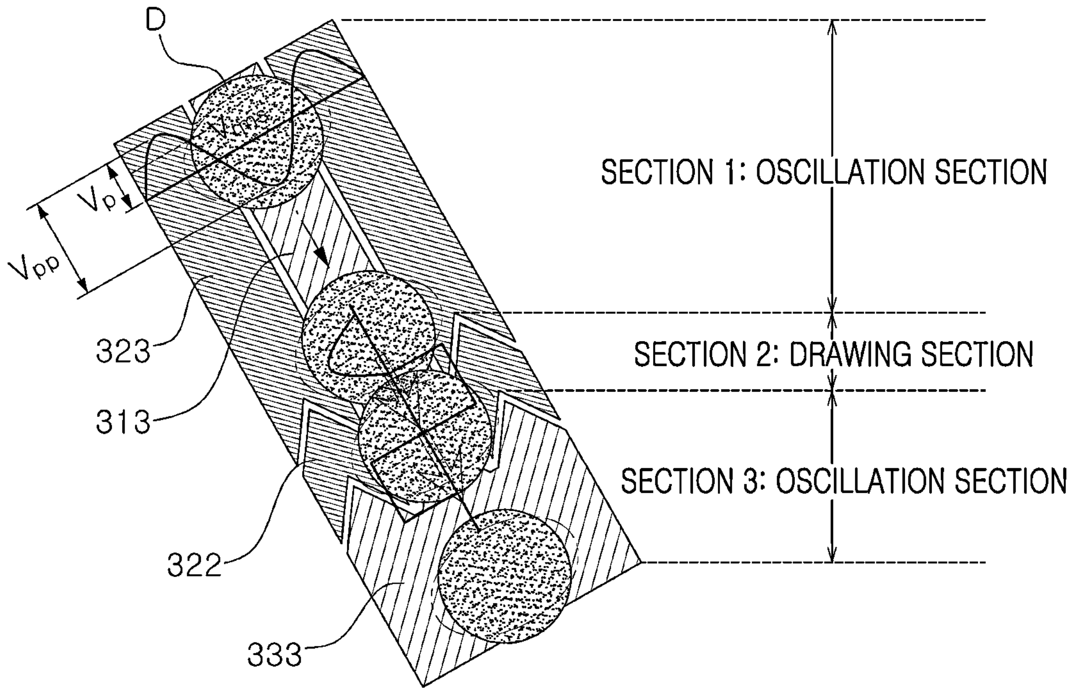
FIG. 6 is a view exemplarily illustrating a principle of a pattern electrode structure according to a third exemplary embodiment of the present disclosure.

In a second exemplary embodiment in FIG. 5, a second basal pattern electrode 222 is provided below the first upper branch electrode 213 and the second upper branch electrode 223 so that the second upper branch electrode 223 is connected to the second basal pattern electrode 222, and the second basal pattern electrode 222 having a different polarity from the first upper branch electrode 213 is provided below the first upper branch electrode 213.

Furthermore, a drawing electrode 215 having a different polarity from the second basal pattern electrode 222 is formed below the second basal pattern electrode 222.

Therefore, Section 1 operates as the oscillation section, Section 2, which goes beyond the boundary, operates as the drawing section, and Section 3 also operates as the oscillation section.

In Section 1, vibration is generated by applying alternating current voltage having a particular frequency, and the fluid droplet falls because of a decrease in fixing force due to the vibration. In Section 2, an attractive force is generated by applying alternating current voltage having a phase difference of 180 degrees from the first upper branch electrode 213 in the region of Section 1 so that acceleration is generated by the attractive force.

Furthermore, the drawing electrode 215 having the same phase difference and size as the first upper branch electrode 213 in Section 1 is provided in Section 3 so that Section 3 has a phase difference of 180 degrees from Section 2 and the attractive force is generated, generating the acceleration.

Two drawing sections may be made, and acceleration may be performed twice. The configuration in which the section, in which the inclination is low, is large (long) is advantageous.

Furthermore, since the electrode, which extends from Section 1, is used in Section 2, the second exemplary embodiment has a higher degree of freedom in the configuration of the electrode than the first exemplary embodiment. The first exemplary embodiment has driving power made by the oscillation in Section 3 even though a magnitude of the driving power is small, but in the second exemplary embodiment, the acceleration disappears and the motion is stopped in Section 3.

Figure 7:
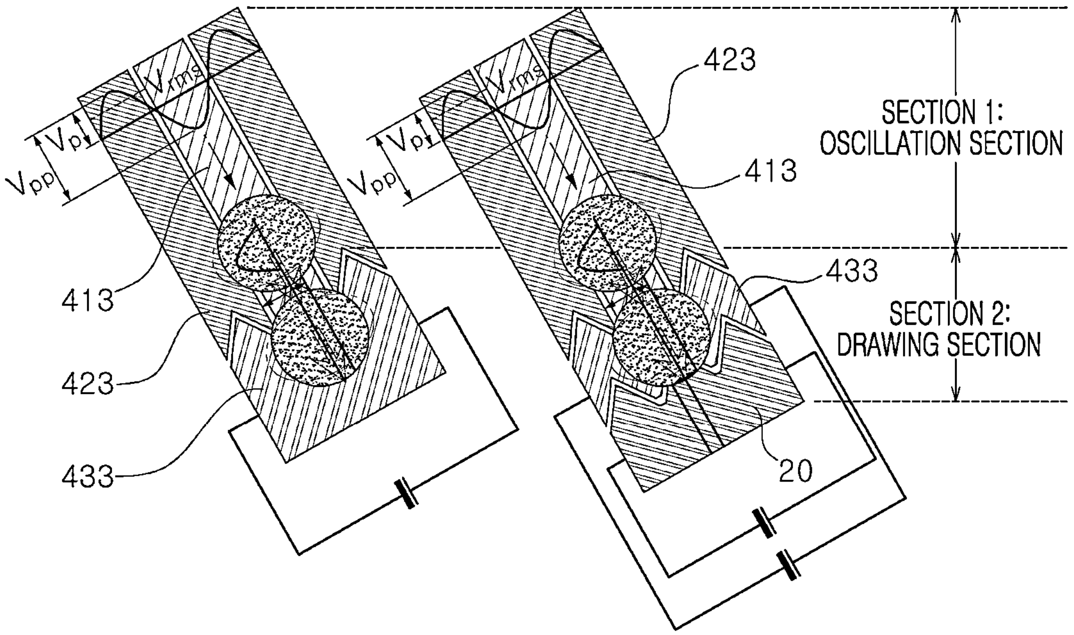
FIG. 7 is a view exemplarily illustrating a principle of a pattern electrode structure according to a fourth exemplary embodiment of the present disclosure.

Next, in a fourth exemplary embodiment in FIG. 7, a third branch electrode 433 having a different polarity from the first upper branch electrode 423 is provided below the first upper branch electrode 413 and the second upper branch electrode 423.

Therefore, Section 1 operates as the oscillation section, and Section 2, which goes beyond the boundary, operates as the drawing section.

In Section 1, vibration is generated by applying alternating current voltage having a particular frequency, and the fluid droplet falls because of a decrease in fixing force due to the vibration. In Section 2, a high attractive force is generated by applying direct current voltage having a sufficient potential difference from Vrms in Section 1.

Only a single direct current electrode may be provided depending on a length of the section in which the drawing motion is required. Alternatively, a plurality of direct current electrodes may be provided.

In the fourth exemplary embodiment, the direct current is used to make the drawing motion without using the alternating current.

In the instant case, a separate direct current circuit needs to be provided, and a circuit is added as the number of direct current sections increases. However, the direct current circuit is simpler than the alternating current, and a vehicle battery of 12 V may be immediately used without separate processing.

Figure 8:
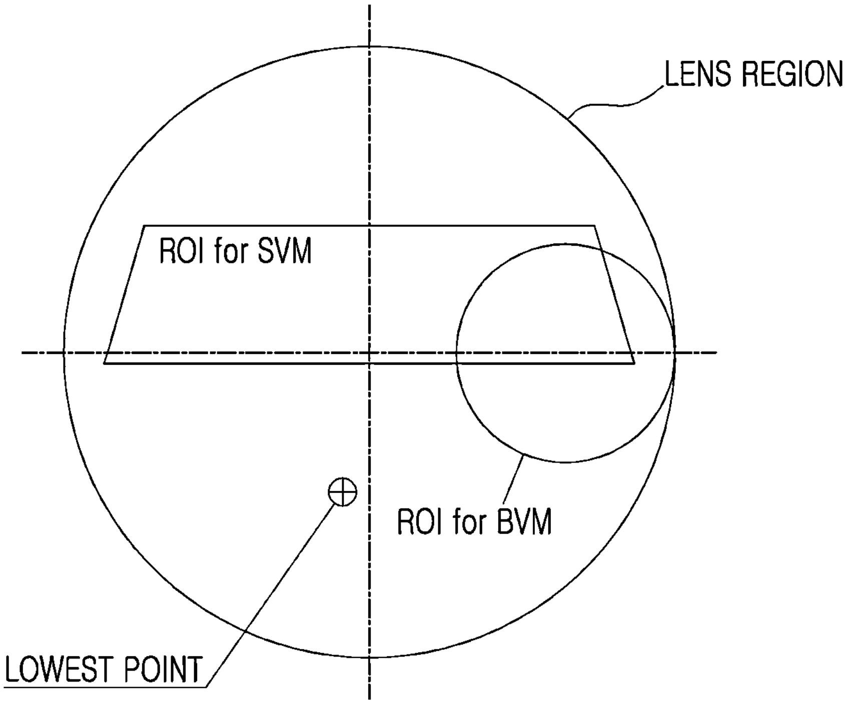
FIG. 8 is a view exemplarily illustrating a region of interest (ROI) of an application target according to an exemplary embodiment of the present disclosure.
Figure 9:
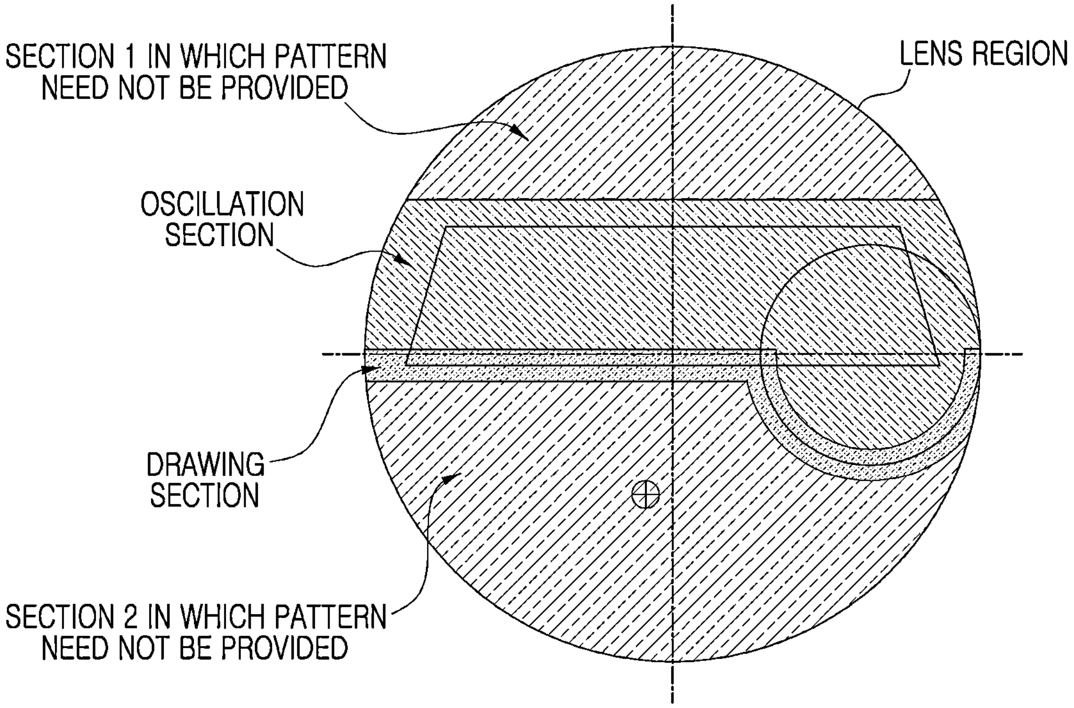
FIG. 9 is a view exemplarily illustrating a method of forming an electrode pattern on a target illustrated in FIG. 8.

FIG. 8 is a view exemplarily illustrating a region of interest (ROI) of an application target according to an exemplary embodiment of the present disclosure, and FIG. 9 is a view exemplarily illustrating a method of forming an electrode pattern on a target illustrated in FIG. 8.

In a case in which the electrowetting apparatus according to an exemplary embodiment of the present disclosure is applied to a lens, a ROI for SVM and a ROI for BVM are indicated in a lens region, as illustrated in FIG. 8.

It can be seen that only a part of the entire lens region is used as the ROI.

A function of removing rainwater needs to operate around a camera ROI, and it is acceptable even though no pattern is provided in a region out of the ROI.

The water droplet slides toward a lowest point, and the movability of the water droplet decreases because the inclination angle decreases as the water droplet becomes close to the lowest point.

As illustrated, the present disclosure serves to draw the water droplets with decreased movability out of the ROI from a boundary point close to the lowest point in the camera ROI (Oscillation Section→Drawing Section).

Hereinafter, the pattern electrode structure according to the respective embodiments of the present disclosure will be sequentially described more particularly with reference to FIGS. 10 to 17.

Figure 10:
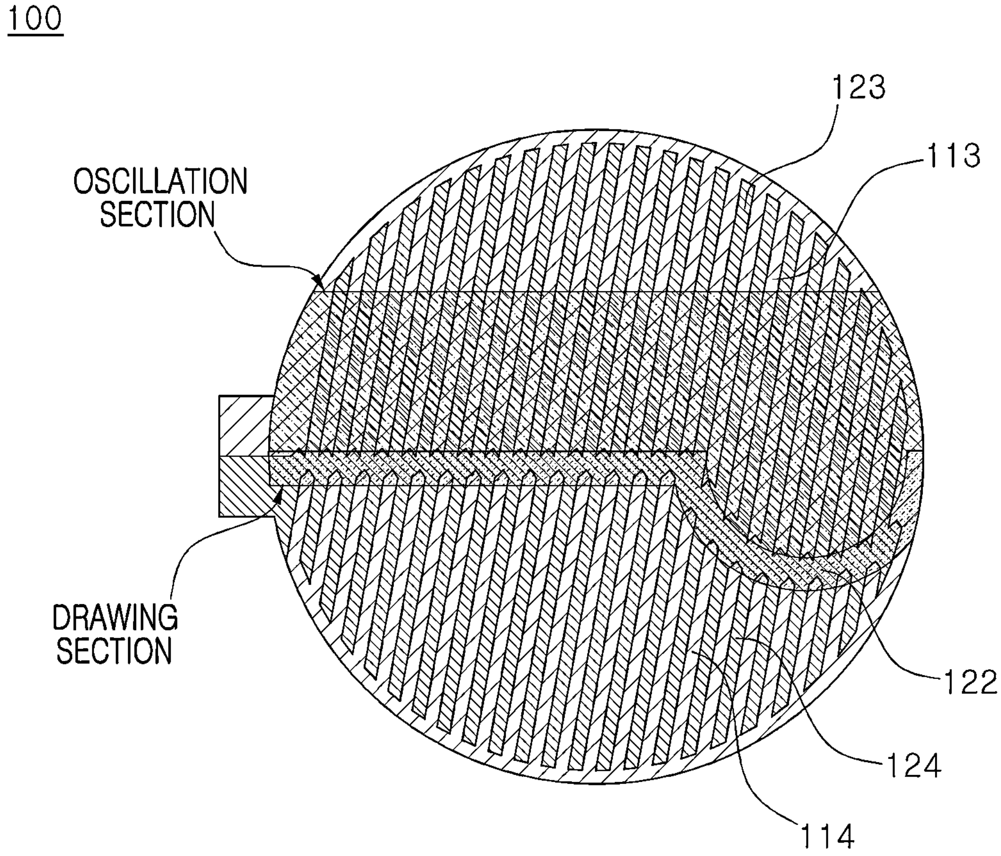
FIG. 10, and FIG. 11 are views exemplarily illustrating the pattern electrode structure according to the first exemplary embodiment of the present disclosure.
Figure 11:
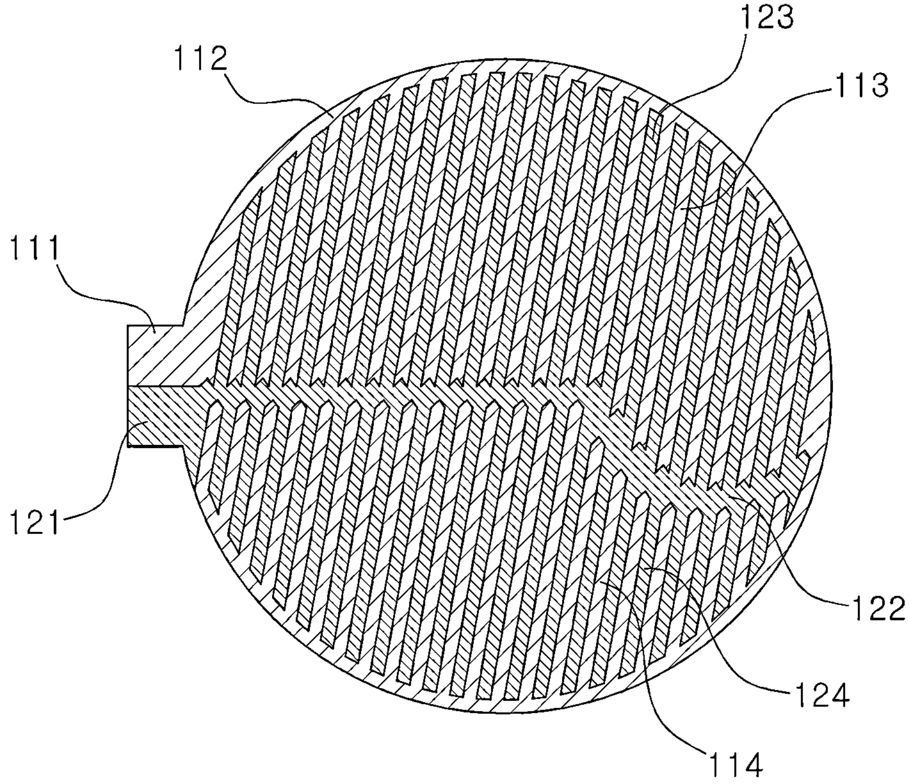

Referring to FIG. 10, and FIG. 11, the pattern electrode structure according to the first exemplary embodiment of the present disclosure includes a first electrode portion and a second electrode portion. The first electrode portion includes a first electrode connection portion 111, a first basal pattern electrode 112, first upper branch electrodes 113, and first lower branch electrodes 114. The second electrode portion includes a second electrode connection portion 121, a second basal pattern electrode 122, second upper branch electrodes 123, and second lower branch electrodes 124.

As illustrated, the pattern electrode structure including an entirely circular plane is referred to as an example. However, when viewed in a plan view, an external periphery of the pattern electrode structure may have various shapes such as a quadrangular shape as long as the characteristics of the branch electrodes according to an exemplary embodiment of the present disclosure are included.

Furthermore, the plane defined by the pattern electrode structure according to an exemplary embodiment of the present disclosure needs to be a plane perpendicular to a horizontal plane or a plane inclined at a predetermined angle with respect to the horizontal plane. The plane may be more efficiently applied when a gradient is small.

Therefore, in the drawings, an inclination of 90 degrees or lower may be formed from an upper end portion to a lower end portion.

The first electrode connection portion 111 and the second electrode connection portion 121 are configured to be connected to a power source to receive voltage. The first basal pattern electrode 112 is connected to the first electrode connection portion 111 to define an external periphery of the entire pattern electrode structure.

Furthermore, one end portion of the second basal pattern electrode 122 is connected to the second electrode connection portion 121, extends to traverse in a width direction of the plane of the pattern electrode structure, and divides the plane of the pattern electrode structure into an upper portion and a lower portion.

The illustrated shape of the second basal pattern electrode 122 is made in consideration of the ROIs for SVM and BVM, but the present disclosure is not limited to the shape. That is, it is acceptable if the shape traverses a lower end portion boundary portion of the ROI of the applied electrowetting apparatus, i.e., a downward direction adjacent to the lower end portion boundary portion. A straight shape or a curved shape may be applied, or a combination of the structure and curved shapes may be applied as illustrated.

Since the plane of the pattern electrode structure is divided by the second basal pattern electrode 122 as described above, the first and second upper branch electrodes 113 and 123 are formed in the upper region including the oscillation section, and the first and second lower branch electrodes 114 and 124 are formed below the second basal pattern electrode 122.

The first upper branch electrodes 113, the second upper branch electrodes 123, the first lower branch electrodes 114, and the second lower branch electrodes 124 are connected to the first basal pattern electrode 112 or the second basal pattern electrode 122 and formed in a vertical direction.

Furthermore, the electrodes may be formed in a direction perpendicular to the vertical direction and inclined at a predetermined angle with respect to a vertical axis, as illustrated.

The first upper branch electrodes 113 and the second upper branch electrodes 123 are alternately provided in the horizontal direction and arranged in parallel.

The first lower branch electrodes 114 and the second lower branch electrodes 124 are also alternately provided in the horizontal direction and arranged in parallel.

However, the second lower branch electrodes 124 are provided in parallel with a longitudinal direction of the first upper branch electrode 113, and the first lower branch electrodes 114 are provided in parallel with a longitudinal direction of the second upper branch electrode 123 so that the drawing motion is generated, as described above with reference to FIG. 4.

That is, the oscillation patterns are formed in the majority of the ROIs, but in the vicinity of the lower end portion of the ROI in which the inclination angle decreases, the branch electrodes having the opposite polarities are alternately provided on the lower portion to have a phase difference of 180 degrees from the branch electrodes on the upper portion to generate the drawing motion.

Therefore, the fluid droplet moves through the oscillation section, accelerates in the drawing section, and then performs the oscillation motion again.

The present pattern structure may be made by changing the arrangement of the electrodes in the related art without a separate circuit configuration. Only the two applied electrode parts may be used like the related art.

Figure 12:
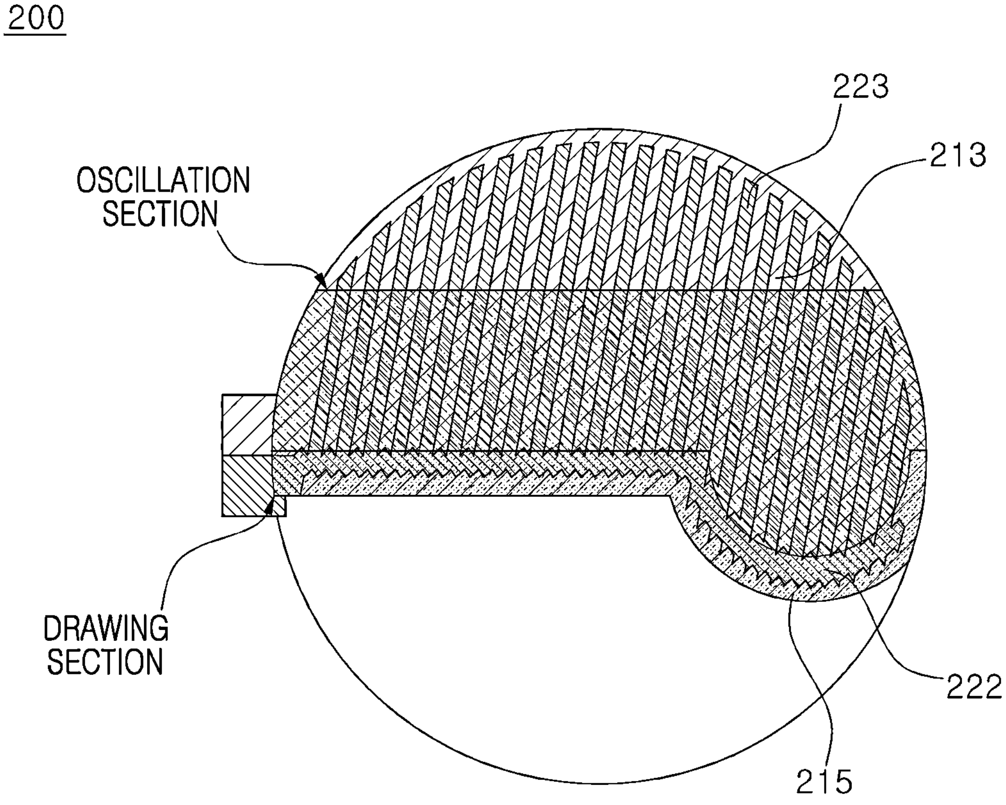
FIG. 12, and FIG. 13 are views exemplarily illustrating the pattern electrode structure according to the second exemplary embodiment of the present disclosure.
Figure 13:
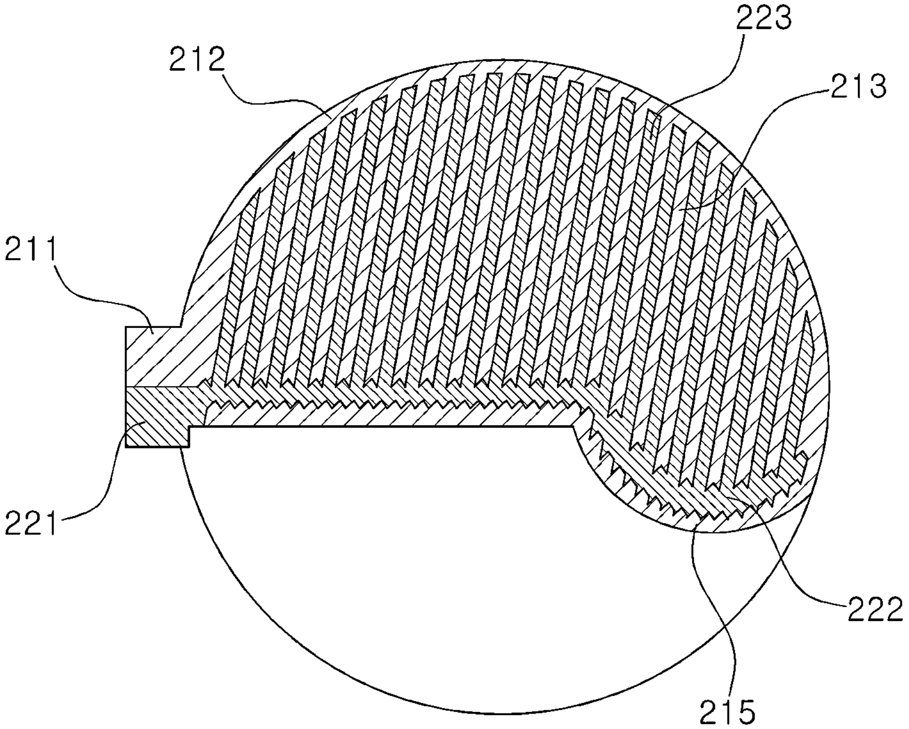

Next, the pattern electrode structure according to the second exemplary embodiment of the present disclosure will be described with reference to FIGS. 12 and 13. The description of the components identical to the components in the first exemplary embodiment will be reduced or omitted.

The pattern electrode structure according to the second exemplary embodiment of the present disclosure includes a first electrode portion and a second electrode portion. The first electrode portion includes a first electrode connection portion 211, a first basal pattern electrode 212, and first upper branch electrodes 213. The second electrode portion includes a second electrode connection portion 221, a second basal pattern electrode 222, and second upper branch electrodes 223.

The first electrode connection portion 211 and the second electrode connection portion 221 are configured to be connected to a power source to receive voltage. The first basal pattern electrode 212 is connected to the first electrode connection portion 211 to define a portion of an external periphery of the entire pattern electrode structure.

Furthermore, one end portion of the second basal pattern electrode 222 is connected to the second electrode connection portion 221, extends to traverse in a width direction of the plane of the pattern electrode structure, and divides the plane of the pattern electrode structure into an upper portion and a lower portion.

Like the first exemplary embodiment, the plane of the pattern electrode structure is divided into the upper portion and the lower portion by the second basal pattern electrode 222. Unlike the first exemplary embodiment, the first and second upper branch electrodes 213 and 223 are formed only in the upper region including the oscillation section, and the first and second lower branch electrodes are not configured.

Instead, a drawing electrode 215 is formed below the second basal pattern electrodes 222, and the drawing electrode 215 has a predetermined width and traverses in the width direction of the plane of the pattern electrode structure, like the second basal pattern electrode 222.

The configurations of the first and second upper branch electrodes 213 and 223 are identical to the configurations in the first exemplary embodiment.

Therefore, the second basal pattern electrode 222 is formed below the first upper branch electrodes 213, and the drawing electrode 215 is formed below the second basal pattern electrode 222 so that the drawing motion is generated as described above with reference to FIG. 5.

That is, the oscillation patterns are formed in the majority of the ROIs, but in the vicinity of the lower end portion of the ROI in which the inclination angle decreases, the drawing electrode 215 branching off from the first basal pattern electrode 212 is provided below the second basal pattern electrode 222 to generate the drawing motion.

Therefore, when the fluid droplet moves through the oscillation section and reaches the lower end portion of the ROI, the fluid droplet flowing along the first upper branch electrodes 213 is drawn primarily by the second basal pattern electrode 222 and drawn secondarily by the drawing electrode 215.

The fluid droplet flowing along the second upper branch electrodes 223 is drawn only primarily by the drawing electrode 215.

The present drawing pattern structure may be made by changing the arrangement of the electrodes in the related art without a separate circuit configuration.

Only the two applied electrode parts may be used like the related art.

Because the region provided out of the ROI is not a region from which the fluid is necessarily removed, the pattern may not be selectively formed in the present region.

Figure 14:
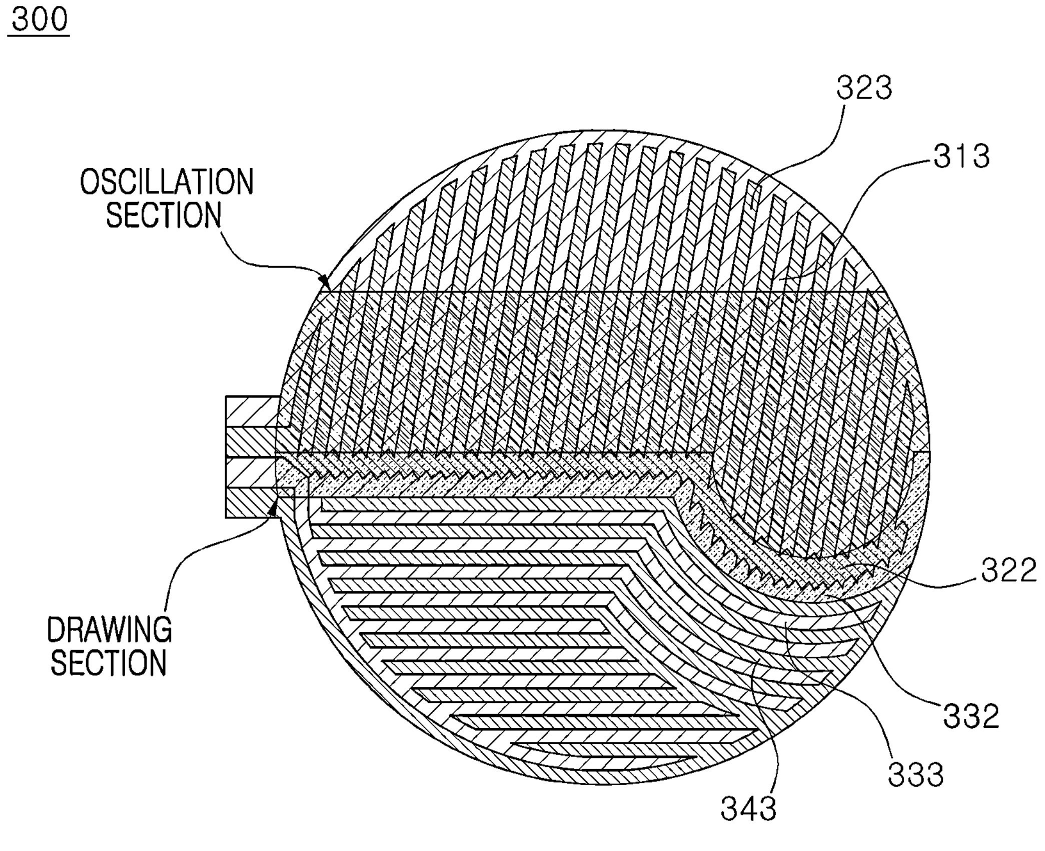
FIG. 14, and FIG. 15 are views exemplarily illustrating the pattern electrode structure according to the third exemplary embodiment of the present disclosure.
Figure 15:
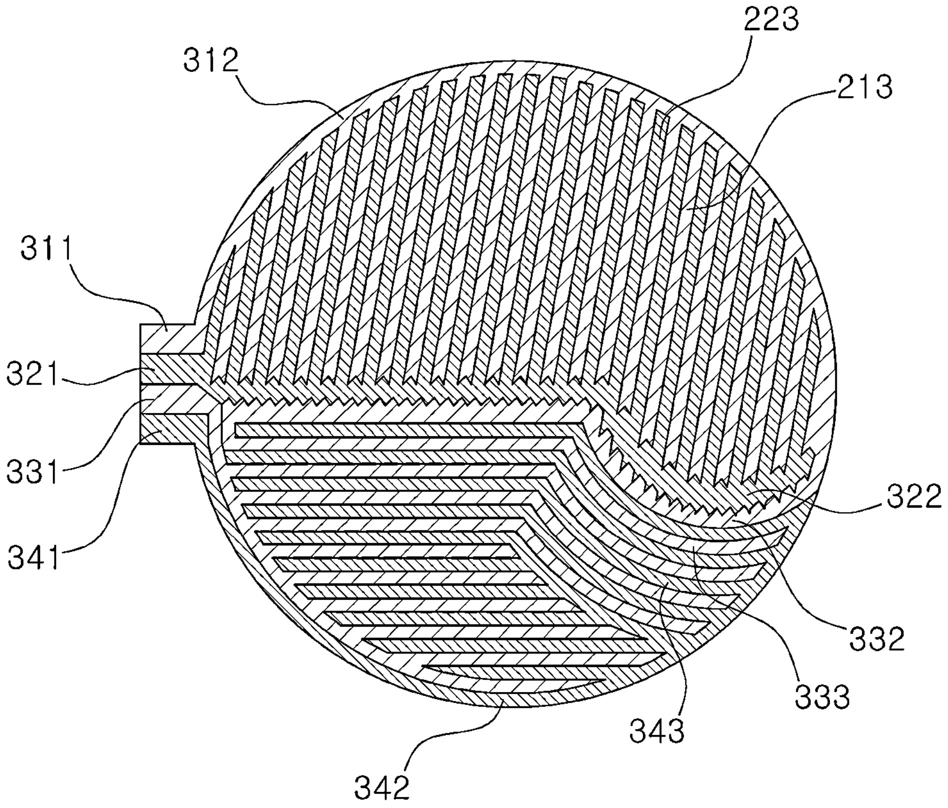

Next, the pattern electrode structure according to the third exemplary embodiment of the present disclosure will be described with reference to FIGS. 14 and 15. The description of the components identical to the components in the first exemplary embodiment will be reduced or omitted.

The pattern electrode structure according to the third exemplary embodiment of the present disclosure includes a first electrode portion, a second electrode portion, a third electrode portion, and a fourth electrode portion. The first electrode portion includes a first electrode connection portion 311, a first basal pattern electrode 312, and first upper branch electrodes 313. The second electrode portion includes a second electrode connection portion 321, a second basal pattern electrode 322, and second upper branch electrodes 323.

The first electrode connection portion 311 and the second electrode connection portion 321 are configured to be connected to a power source to receive voltage. The first basal pattern electrode 312 is connected to the first electrode connection portion 311 to define a portion of an external periphery of the entire pattern electrode structure.

Furthermore, one end portion of the second basal pattern electrode 322 is connected to the second electrode connection portion 321, extends to traverse in a width direction of the plane of the pattern electrode structure, and divides the plane of the pattern electrode structure into an upper portion and a lower portion.

Furthermore, the third electrode portion includes a third electrode connection portion 331, a third basal pattern electrode 332, and third branch electrodes 333. The third branch electrode 333 is formed below the second basal pattern electrode 322, and the third branch electrode 333 has a predetermined width and traverses in the width direction of the plane of the pattern electrode structure, like the second basal pattern electrode 322.

Furthermore, the plurality of third branch electrodes 333 branching off from the third basal pattern electrode 332 is spaced from one another in the vertical direction.

The fourth electrode portion includes a fourth electrode connection portion 341, a fourth basal pattern electrode 342, and fourth branch electrodes 343. The plurality of fourth branch electrodes 343 is formed in the width direction and provided between the third branch electrodes 333.

Therefore, the first and second upper branch electrodes 313 and 323 are configured to generate the oscillation motion in the ROI, and the third and fourth branch electrodes 333 and 343 are configured to generate the drawing motion in an edge portion of the ROI and a region provided out of the ROI.

When the fluid droplet moves through the oscillation section and reaches the lower end portion of the ROI, the fluid droplet flowing along the first upper branch electrodes 313 is drawn primarily by the second basal electrode and drawn secondarily by the third branch electrodes 333.

The fluid droplet flowing along the second upper branch electrodes 323 is drawn only primarily by the third branch electrode 333.

The third branch electrodes 333 are positioned at lower end portions of the second upper branch electrodes 323, and the drawing motion may be generated by applying voltage having a phase difference and a potential difference from the second upper branch electrodes 323. Furthermore, the voltage to be applied to the third and fourth branch electrodes 333 and 343 may be different in waveforms, phases, magnitudes, and the like from the voltage to be applied to the first and second upper branch electrodes 313 and 323.

As illustrated, the third and fourth branch electrodes 333 and 343 need not occupy the entire lower end portion of the board, and the number of branch electrodes may be adjusted depending on the design specifications. However, a pair of pattern electrodes is necessarily needed.

Figure 16:
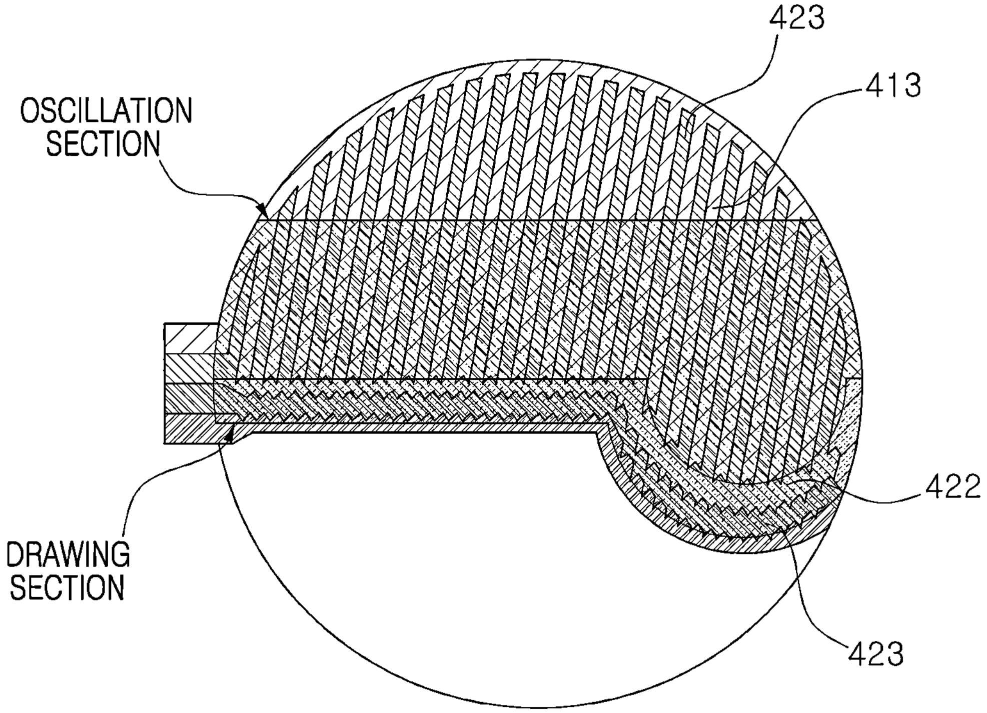
FIG. 16 and FIG. 17 are views exemplarily illustrating the pattern electrode structure according to the fourth exemplary embodiment of the present disclosure.
Figure 17:
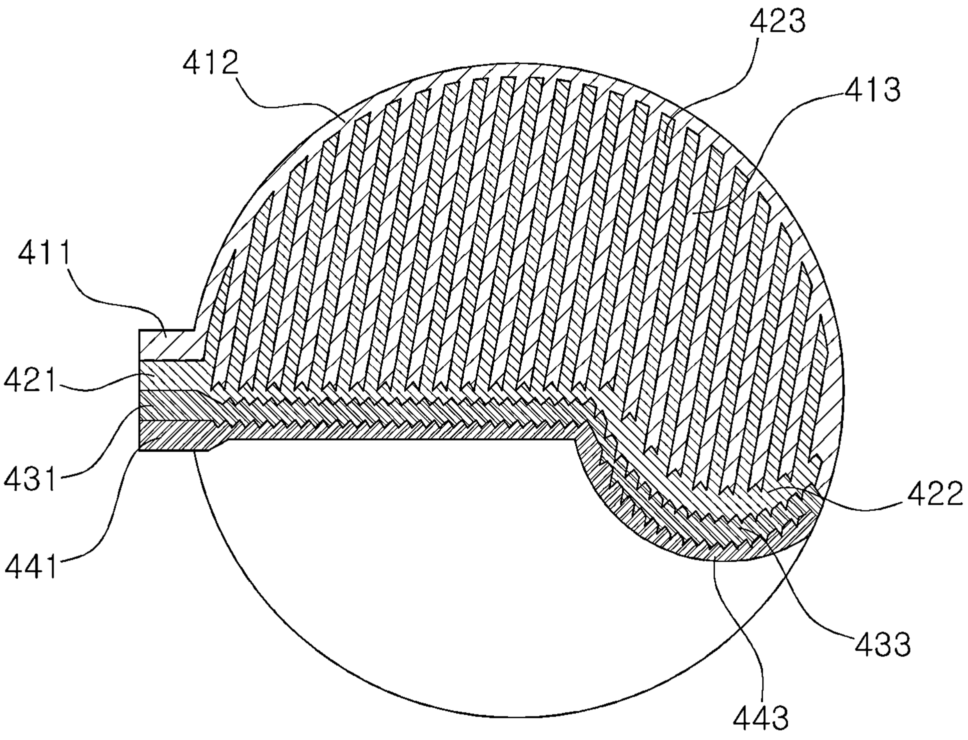

Lastly, the pattern electrode structure according to the fourth exemplary embodiment of the present disclosure will be described with reference to FIGS. 16 and 17. The description of the components identical to the components in the first exemplary embodiment will be reduced or omitted.

The pattern electrode structure according to the fourth exemplary embodiment of the present disclosure includes a first electrode portion, a second electrode portion, a third electrode portion, and a fourth electrode portion. The first electrode portion includes a first electrode connection portion 411, a first basal pattern electrode 412, and first upper branch electrodes 413. The second electrode portion includes a second electrode connection portion 421, a second basal pattern electrode 422, and second upper branch electrodes 423.

The first electrode connection portion 411 and the second electrode connection portion 421 are configured to be connected to a power source to receive voltage. The first basal pattern electrode 412 is connected to the first electrode connection portion 411 to define a portion of an external periphery of the entire pattern electrode structure.

Furthermore, one end portion of the second basal pattern electrode 422 is connected to the second electrode connection portion 421, extends to traverse in a width direction of the plane of the pattern electrode structure, and divides the plane of the pattern electrode structure into an upper portion and a lower portion.

Furthermore, the third electrode portion includes a third electrode connection portion 431 and a third branch electrode 433, and the fourth electrode portion includes a fourth electrode connection portion 441 and a fourth branch electrode 443.

The third branch electrode 433 is formed below the second basal pattern electrode 422, and the third branch electrode 433 has a predetermined width and traverses in the width direction of the plane of the pattern electrode structure, like the second basal pattern electrode 422.

Furthermore, the fourth branch electrode 443 is formed below the third branch electrode 433, and the fourth branch electrode 443 has a predetermined width and traverses in the width direction of the plane of the pattern electrode structure, like the third branch electrode 433.

Therefore, the first and second upper branch electrodes 413 and 423 are configured to generate the oscillation motion of the ROI, and the third branch electrode 433 is configured to generate the drawing motion in an edge portion of the ROI and a region provided out of the ROI.

When the fluid droplet moves through the oscillation section and reaches the lower end portion of the ROI, the fluid droplet flowing along the first upper branch electrodes 413 is drawn primarily by the second basal pattern electrode 422 and drawn secondarily by the third branch electrode 433.

The fluid droplet flowing along the second upper branch electrode 423 is drawn only primarily by the third branch electrode 433.

The third branch electrode 433 is positioned at lower end portions of the second upper branch electrodes 423, and the drawing motion may be generated by applying direct current voltage having a potential difference from the second upper branch electrodes 423.

However, a value of the voltage to be applied to the third branch electrode 433 needs to be different by a predetermined level or higher from a Vrms value of the voltage to be applied to the first and second upper branch electrodes 413 and 423.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pattern electrode structure for an electrowetting apparatus, which is laminated between a base material and a dielectric layer of the electrowetting apparatus, the pattern electrode structure comprising:

a first electrode portion formed on the base material of the pattern electrode structure and including a first electrode connection portion, a first basal pattern electrode connected to the first electrode connection portion, and a plurality of first upper branch electrodes connected to the first basal pattern electrode; and a second electrode portion formed on the base material of the pattern electrode structure and including a second electrode connection portion, a second basal pattern electrode connected to the second electrode connection portion, and a plurality of second upper branch electrodes connected to the second basal pattern electrode, the second electrode portion having a different polarity from the first electrode portion, wherein the second basal pattern electrode extends across a central region of a plane of the pattern electrode structure in a width direction of the pattern electrode structure, and wherein the first electrode portion further includes a plurality of first lower branch electrodes, the second electrode portion further includes a plurality of second lower branch electrodes, and the plurality of first and the plurality of second lower branch electrodes are formed in a lower region defined by the second basal pattern electrode, provided in a vertical direction of the pattern electrode structure, and alternately provided in parallel with one another in a horizontal direction of the pattern electrode structure.

2. The pattern electrode structure of claim 1, wherein the second basal pattern electrode is formed at a height corresponding to a boundary portion of a lower end portion of a region of interest (ROI) of the electrowetting apparatus.

3. The pattern electrode structure of claim 2, wherein the plurality of first upper branch electrodes and the plurality of second upper branch electrodes are formed in an upper region defined by the second basal pattern electrode, provided in the vertical direction of the pattern electrode structure, and alternately provided in parallel with one another in the horizontal direction.

4. The pattern electrode structure of claim 1, wherein the plurality of first upper branch electrodes and the plurality of second lower branch electrodes are formed in parallel, and the plurality of second upper branch electrodes and the plurality of first lower branch electrodes are formed in parallel.

5. The pattern electrode structure of claim 3, further including:

a drawing electrode formed below the second basal pattern electrode and extending transversely to the plane of the pattern electrode structure.

6. The pattern electrode structure of claim 5, wherein the drawing electrode is connected to the first electrode connection portion.

* * * * *